US009960965B2

(12) United States Patent
Krapp et al.

(10) Patent No.: US 9,960,965 B2
(45) Date of Patent: May 1, 2018

(54) STATELESS ADMISSION CONTROL

(75) Inventors: Steven John Krapp, Naperville, IL (US); William Turner Hanks, Carol Stream, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 297 days.

(21) Appl. No.: 13/021,478

(22) Filed: Feb. 4, 2011

(65) Prior Publication Data
US 2012/0201129 A1 Aug. 9, 2012

(51) Int. Cl.
*H04L 12/24* (2006.01)
*H04L 12/923* (2013.01)
*H04L 12/911* (2013.01)

(52) U.S. Cl.
CPC ........ *H04L 41/0896* (2013.01); *H04L 47/745* (2013.01); *H04L 47/748* (2013.01); *H04L 47/762* (2013.01)

(58) Field of Classification Search
CPC . H04L 41/0896; H04L 47/745; H04L 47/748; H04L 47/762; H04L 47/10; H04L 2012/5631; H04L 47/15; H04L 47/2441; H04L 47/70; H04L 47/30; H04L 47/11; H04L 47/12; H04L 47/127; G06F 3/12; G06F 1/00923; G06F 1/32; G06F 13/38; G06F 13/385

USPC .................................................. 370/229–253
See application file for complete search history.

(56) References Cited

U.S. PATENT DOCUMENTS

| 6,091,709 | A | * | 7/2000 | Harrison | H04L 12/5695 370/235 |
| 7,852,865 | B2 | * | 12/2010 | Gay | H04L 12/2801 370/412 |
| 2006/0087681 | A1 | * | 4/2006 | Iwamoto et al. | 358/1.15 |
| 2007/0091801 | A1 | * | 4/2007 | Shahidi et al. | 370/230 |
| 2007/0230348 | A1 | * | 10/2007 | Zhong | H04M 11/062 370/235 |
| 2009/0199190 | A1 | * | 8/2009 | Chen et al. | 718/102 |
| 2011/0158095 | A1 | * | 6/2011 | Alexander | H04L 47/805 370/232 |

* cited by examiner

*Primary Examiner* — Kwang B Yao
*Assistant Examiner* — Hardikkumar Patel
(74) *Attorney, Agent, or Firm* — Bart A. Perkins

(57) ABSTRACT

Methods and apparatuses for control admission to network resources are provided. Probationary service flows with a reduced priority are provisionally allowed to use network resources. As the network demonstrates its continued stability by the addition of the new probationary flows, each probationary flow can be re-assigned its original priority thereby promoting the probationary flow to a non-probationary status.

14 Claims, 4 Drawing Sheets

STATELESS ADMISSION CONTROL

TECHNICAL FIELD

This disclosure relates to admission control.

BACKGROUND

A Data-Over-Cable Service Interface Specification (DOCSIS) system, for example, can be used to deliver high-definition digital entertainment and telecommunications such as video, voice, and high-speed Internet to subscribers over an existing cable television network. The cable television network can take the form of an all-coax, all-fiber, or hybrid fiber/coax (HFC) network. A multiple service operator (MSO) can deliver these services to subscribers by using a cable modem termination system (CMTS) located at a headed and customer premise equipment (CPE) devices located at subscriber premises. The CPE devices can include cable modems (CMs) or embedded multimedia terminal adapters (eMTAs). A CMTS routes traffic (e.g., data, video, and voice signals) to and from CPE devices on downstream and upstream channels, respectively.

A service flow generally refers to the unidirectional transport of packets including one or more common packet header attributes specified by a classifier and with quality of service (QoS) traffic parameters (e.g., bandwidth, latency, jitter, throughput speed, etc.). Upstream and downstream service flows can be subject to admission control. That is, control mechanisms may exist in the CMTS, for example, to determine whether upstream or downstream traffic can enter the network via service flows to deliver a service. For example, if a client wishes to use network resources for a service, the client may have to first request to use the network resources prior to being permitted to use the network resources to transmit traffic upstream. When the CMTS receives a request to use the network resources, the CMTS can determine whether the network resources exist for the requested services. If the CMTS determines that the network resources are available for the requested service, it can permit the client to use the requested network resources. Conversely, if the CMTS determines that the network resources for the requested service do not exist, then the CMTS can deny access to the network resources.

Alternatively, if the CMTS determines that access to a requested service is part of a subscription plan associated with the requesting client, the CMTS can permit the client to use the requested network resource(s). If the CMTS determines that access to the requested service is not part of a subscription plan associated with the requesting client, the CMTS can deny use of the requested network resource(s).

By providing admission control, the system can control network congestion by denying access to the network during periods of scarce resources. Admission control thereby helps reduce the chances that a new service flow can cause network congestion. Network congestion can result in service degradation for one or more service flows on the network as they contend for resources. For example, for voice traffic, if the network becomes congested, voice traffic packets may be dropped or delayed for any calls on the network thereby resulting in service degradation for all calls.

Admission control processes are typically complex and require detailed information about the service flow being added, information about the existing flows, and information about the system, for example, prior to making an admission control decision.

This disclosure generally describes an admission control process for network resources, such as the cable network resources in a DOCSIS-based system, for example. However, this disclosure is not limited to a cable network or DOCSIS-based system.

DETAILED DESCRIPTION

Various implementations of this disclosure add service flows with a reduced priority on a probationary basis. As the network demonstrates its continued stability after the addition of a new probationary flow, a probationary flow can be re-assigned its original priority thereby promoting the probationary flow to a non-probationary status.

Figure 1:
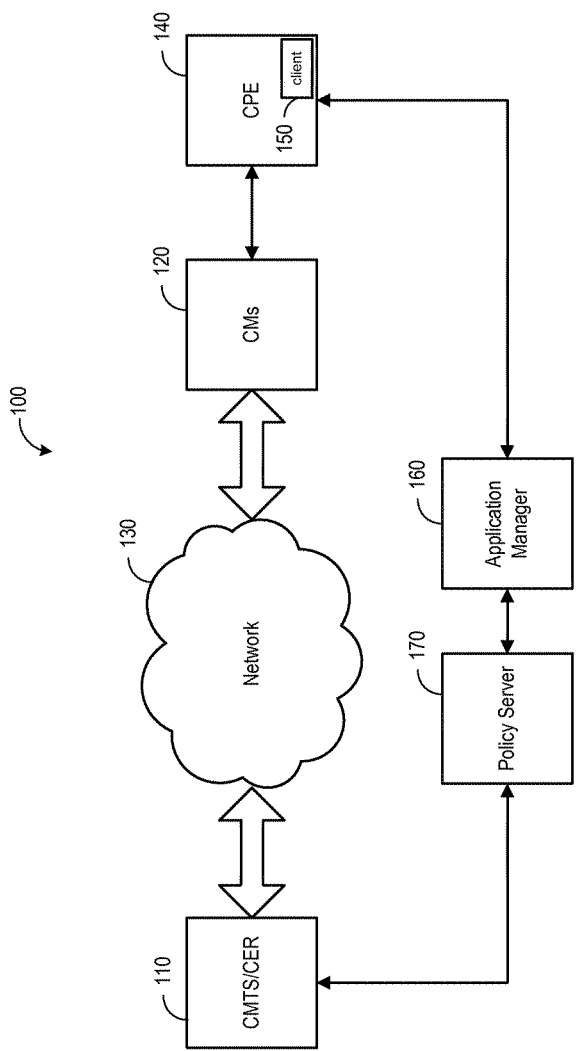
FIG. 1 is a block diagram illustrating an example DOCSIS-based system used to provide communications between a CMTS and a CM over a network.

FIG. 1 illustrates an example DOCSIS-based system operable to deliver high-definition digital entertainment and telecommunications such as video, voice, and high-speed Internet to subscribers over an existing cable television network. As shown in FIG. 1, traffic (e.g., data, video, and voice signal) can be transferred over a cable network 130 between a CMTS 110 or Converged Edge Router (CER) and a cable modem (CM) 120. The cable network 130 can take the form of an all-coax, all-fiber, or hybrid fiber/coax (HFC) network. Traffic transferred from the CMTS 110 to the CM 120 can be said to travel in a downstream direction; conversely, traffic transferred from the CM 120 to the CMTS 110 can be said to travel in an upstream direction. Once the CM 120 receives traffic from the CMTS 110 via the network 130, the CM 120 can deliver the traffic to another CPE device 140 such as a home gateway, a personal computer or IP telephone. The CPE device 140 can include a client 150 software or hardware application such as a video home gateway or multimedia terminal adapter (MTA) 150.

Figure 2:
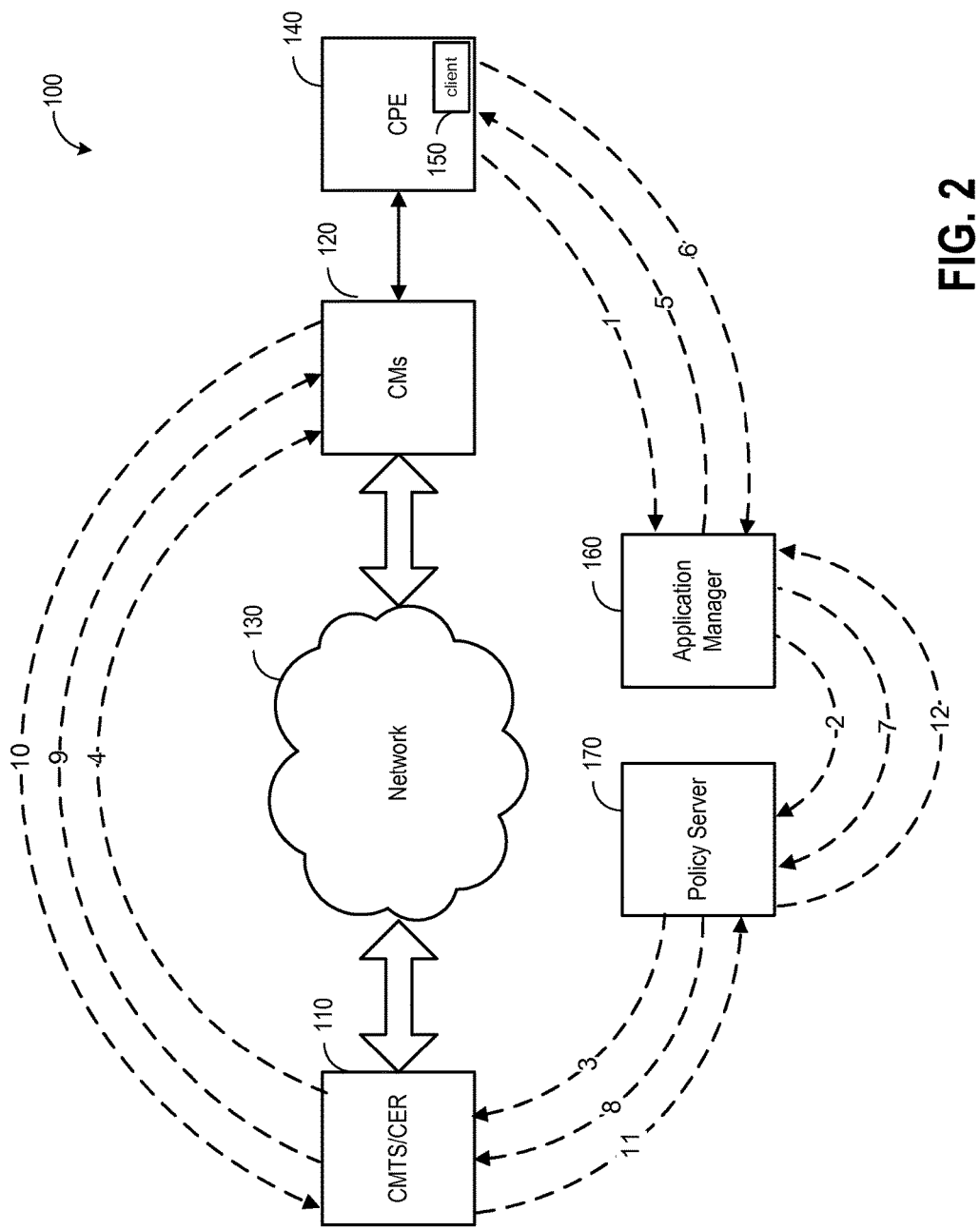
FIG. 2 is a block diagram illustrating an example signaling process operable to provide admission control for service flows.

FIG. 2 illustrates an example signaling process that can be used by a DOCSIS-based system 100 to control the admission of new service flows. Service flows can be initiated by a client application for example. If the client 150 desires to use network resources for a service, at stage 1, the client 150 signals an application manager (AM) 160 to request the creation of a new session/service flow.

The AM 160 determines the QoS parameters for the new session and signals a policy server (PS) 170 to request the creation of a new service flow with the QoS parameters at stage 2. At stage 3, the PS 170 initiates a request to the CMTS 110 for the creation of a new service flow with the QoS parameters. The CMTS receives the request and determines whether there are enough network resources available for the requested service flow. This determination can be made based on state information gathered, for example, from the current and previous signaling about the service flow being added and existing service flows and information about the system. If the CMTS decides that there are enough network resources available, the CMTS 110, at stage 4, signals the CM 120 regarding the new service flow for the application session. The AM 160, at stage 5, then signals the client 150 that the QoS resources are activated.

Upon finishing with the application session, the client 150 signals the AM 160 indicating an end to the session at stage 6. At stage 7, the AM 160 signals the PS 170 to request deletion of the service flow. At stage 8, the PS 170 forwards the deletion request to the CMTS 110. The CMTS 110 receives the deletion request and signals the CM to delete the service flow for the application session at stage 9. The CM 120 deletes the service flow and sends an acknowledgement to the CMTS 110 at stage 10. The CMTS then deletes a gate providing access to a backbone network (not shown) that may have been used for the application session and informs the PS 170 that the gate has been deleted at stage 11. At stage 12, the PS 170 signals the AM 160 of the gate deletion.

As shown above, existing admission control processes rely on complex signaling and state information to determine whether network resources exist for a requested service across a network. It should be understood that new protocols, such as IGMP, are being implemented in DOCSIS-based systems that do not require signaling protocols for admission control. Accordingly, it can be desirable to perform admission control without maintaining state information and/or without complex signaling between devices.

Figure 3:
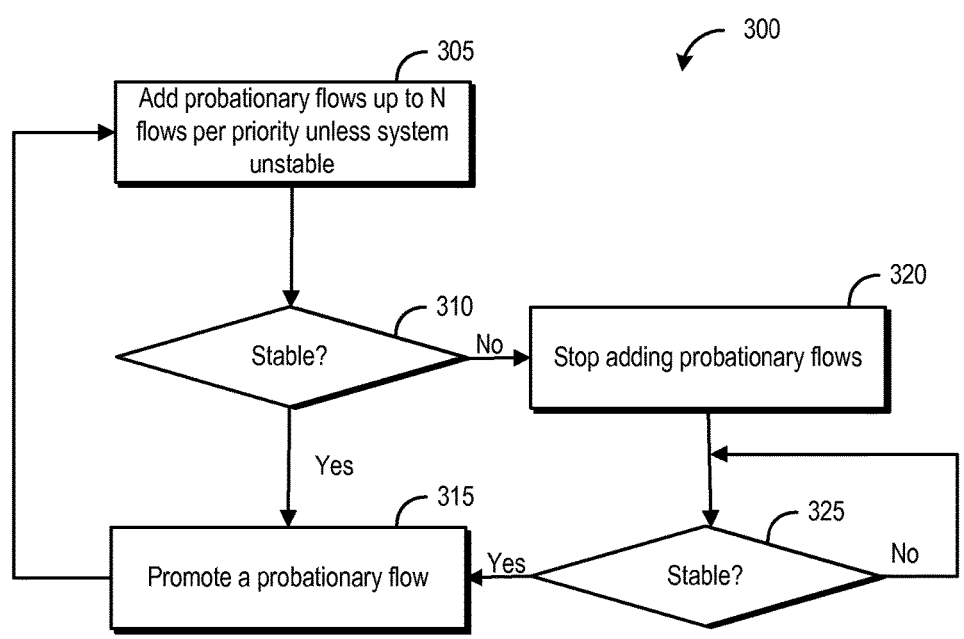
FIG. 3 is a flowchart illustrating an example stateless admission control process that does not maintain state information and does not require complex signaling between devices.

FIG. 3 illustrates an example stateless admission control process 300 that does not maintain state information and does not require complex signaling between devices. Generally, each new service flow that is subject to admission control is first activated on a probationary basis as a probationary flow with a reduced priority. As the network demonstrates its continued stability by the addition of the new probationary flows, each probationary service flow can be re-assigned to its original priority thereby promoting the probationary service flow to a non-probationary status. This process minimizes the effect of the newly added probationary service flows on existing non-probationary service flows. The example stateless admission control process 300 can be less complex than existing admission control processes by not requiring complex signaling and state information. Thus, example stateless admission control process 300 can be used in systems implementing protocols that can bypass admission control processes (such as IGMP).

More specifically, at stage 305, for each priority level available in a system, until the network becomes unstable, new probationary service flows up to N flows are automatically added for application sessions that desire use of network resources. For example, in a DOSCIS-based system, there are eight (8) priorities levels. For each priority, up to N new probationary service flows can be activated, unless and until the network becomes unstable. Each probationary service flow is activated with a probationary priority p' that can be lower than the assigned priority, p, for the corresponding application session. In one implementation, the probationary priority, p', is equal to p−1. By automatically accepting new service flows only on the condition that the system is not currently unstable and assigning each new service flow a provisional priority that can be lower than its originally assigned priority, new service flows can be efficiently added to the system. Furthermore, existing non-probationary service flows having a priority higher than the provisional priority are less likely to be affected if congestion occurs.

In another implementation, the probationary priority, p', is set equal to a priority that is less than the lowest priority in the network for an application session that is subject to admission control. In this way, newly added service flows are less likely to affect any existing non-probationary service flows.

The value of N can be chosen to avoid congestion. That is, the number of probationary service flows a system can handle under certain conditions can be estimated. Accordingly, N can be chosen in an effort to prevent congestion in the first instance. In one implementation, N can equal infinity. That is, new service flows can be activated until the network becomes unstable. Thus, in some implementations, a precondition to admission of a probationary service flow is whether the network is currently stable. If the network is not currently stable, a probationary service flow can be denied.

At stage 310, it is determined whether the network is stable as a result of the addition of the new probationary flow(s). In one implementation, the CMTS 110 makes this determination. This determination can be made concurrently with stage 305. That is, as new probationary service flows are activated on the system, the system can check the status of the network. In one implementation, the stability of the network can be based on the amount of packet loss in the network or for a particular application. This determination also can be a function of the amount of time that that has elapsed since a probationary service flow was added and/or the amount of data that has been transferred over the network via the probationary service flow.

If the network is deemed stable (e.g., "Yes" at stage 310), then at stage 315, a probationary flow is re-assigned a priority of p, thereby becoming promoted to a non-probationary flow status. In one implementation, the oldest probationary flow is promoted to a non-probationary service flow status (e.g., re-assigned to a priority of p, its original priority). In other implementations, probationary flows other than the oldest probationary flow can be promoted to non-probationary status.

If the network is deemed unstable (e.g., "No" at stage 310), no probationary service flows are promoted to a non-probationary flow status and, at stage 320, no new service flows are added to the system.

After a predetermined period, it is determined at stage 325 whether the network is still unstable. If the network is still unstable, the system continues to check the network status until the network is deemed stable. In one implementation, the system can take additional corrective action if the system continues to remain unstable. If the network is deemed stable (e.g., "Yes" at stage 325), the system returns to stage 315 and promotes a probationary service flow to a non-probationary flow status.

Figure 4:
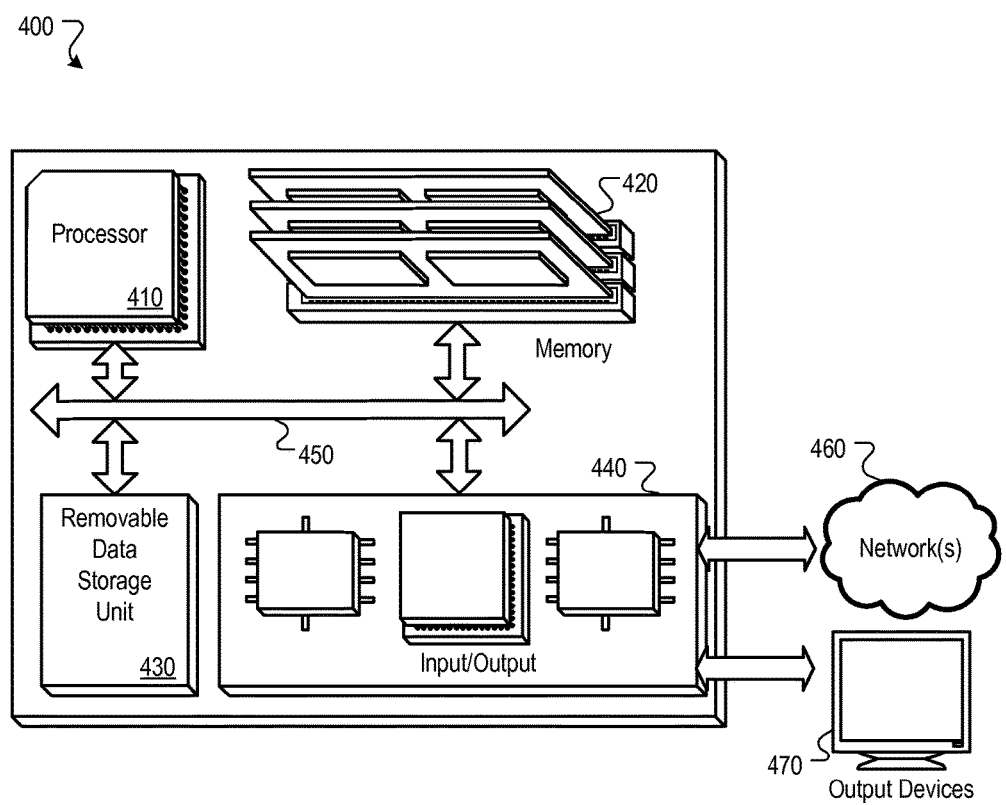
FIG. 4 is a block diagram illustrating an example broadband communications device operable to perform stateless admission control.

FIG. 4 illustrates an example the CMTS 110 operable to perform the example process 300 of FIG. 3. The CMTS 110 can include a processor 410, a memory 420, a removable data storage unit 430, and an input/output device 440. Each of the components 410, 420, 430, and 440 can, for example, be interconnected using a system bus 450. In some implementations, the CMTS 110 can include one of more interconnected boards where each board comprising components 410, 420, 430, and 440. The processor 410 is capable of processing instructions for execution within the CMTS 110. For example, the processor 610 can be capable of processing instructions for executing the process 300 of FIG. 3 in the CMTS 110. In some implementations, the processor 410 is a single-threaded processor. In other implementations, the processor 410 is a multi-threaded processor. The processor 410 is capable of processing instructions stored in the memory 420 or on the storage device 430.

The memory 420 stores information within the CMTS 110. In some implementations, the memory 420 is a computer-readable medium. In other implementations, the memory 420 is a volatile memory unit. In still other implementations, the memory 420 is a non-volatile memory unit.

In some implementations, the storage device 430 is capable of providing mass storage for the CMTS 110. In one implementation, the storage device 430 is a computer-readable medium. In various different implementations, the storage device 430 can, for example, include a hard disk device, an optical disk device, flash memory or some other large capacity storage device.

The input/output device 440 provides input/output operations for the CMTS 110. In one implementation, the input/output device 440 can include one or more of a wireless interface, HFC network interface, such as, for example, an IP network interface device, e.g., an Ethernet card, a cellular network interface, a serial communication device, e.g., and RS-232 port, and/or a wireless interface device, e.g., and 802.11 card. In another implementation, the input/output device 440 can include driver devices configured to receive input data and send output data to other input/output devices, as well as sending communications to, and receiving communications from various networks.

Implementations of the device of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

The processes and logic flows described in this specification can be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, implementations of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The invention claimed is:

1. A method for admission control to manage network resources, the method comprising:
   receiving a request for activation of a service flow;
   identifying a service flow type associated with the service flow;
   based on the service flow type, determining an assigned priority associated with the service flow;
   automatically activating the service flow as a probationary service flow having a probationary priority for delivering traffic associated with the service flow across a network, wherein the probationary priority is lower than the assigned priority associated with the service flow, and wherein the service flow is given a probationary priority for a temporary duration of time, the temporary duration of time comprising a duration of time from the activation of the service flow until a determination is made that the network is stable;
   determining whether the network is stable as a result of the activation of the service flow at the probationary priority; and
   when the determination is made that the network is stable, updating the probationary service flow by promoting the probationary service flow to a conventional service flow and updating the priority given to the service flow from the probationary priority to the assigned priority determined to be associated with the service flow.

2. The method of claim 1, wherein the probationary priority is less than the lowest priority in the network for any application session that is subject to admission control.

3. The method of claim 1, wherein the assigned priority associated with the service flow is an assigned priority for an application session associated with the service flow.

4. The method of claim 1, wherein determining whether the network is stable as a result of the activation of the probationary service flow is based on the number of lost packets in the network.

5. The method of claim 1, wherein automatically activating the probationary service flow comprises activating the probationary service flow without determining whether adequate network resources exist to handle the probationary service flow.

6. The method of claim 1, further comprising determining whether the network is stable prior to activating the probationary service flow.

7. The method of claim 1, further comprising:
determining whether a number of probationary service flows exceeds a maximum number of probationary service flows; and
denying an automatic admission of the service flow as a probationary service flow based upon the number of probationary service flows exceeding the maximum number of probationary service flows.

8. A non-transitory computer readable medium having instructions for causing a computer to execute a method for admission control to manage network resources, the method comprising:
receiving a request for activation of a service flow;
identifying a service flow type associated with the service flow;
based on the service flow type, determining an assigned priority associated with the service flow;
automatically activating the service flow as a probationary service flow at a first priority for delivering traffic across a network for an application session associated with the service flow, wherein the first priority is a probationary priority that is lower than the assigned priority associated with the service flow, and wherein the service flow is given a probationary priority for a temporary duration of time, the temporary duration of time comprising a duration of time from the activation of the service flow until a determination is made that the network is stable;
determining whether the network is stable as a result of the activation of the service flow at the probationary priority; and
when the determination is made that the network is stable, updating the probationary service flow by promoting the probationary service flow to a conventional service flow and updating the priority given to the service flow from the probationary priority to the assigned priority determined to be associated with the service flow.

9. The non-transitory computer readable medium of claim 8, wherein the first priority is less than the lowest priority in the network for any application session that is subject to admission control.

10. The non-transitory computer readable medium of claim 8 wherein determining whether the network is stable as a result of the activation of the probationary service flow is based on the number of lost packets in the network.

11. The non-transitory computer readable medium of claim 8, wherein automatically activating the probationary service flow comprises activating the probationary service flow without determining whether adequate network resources exist to handle the service flow.

12. The non-transitory computer readable medium of claim 8, further comprising determining whether the network is stable prior to activating the probationary service flow.

13. The non-transitory computer readable medium of claim 8, further comprising:
determining whether a number of probationary service flows exceeds a maximum number of probationary service flows; and
denying an automatic activation of the probationary service flow based upon the number of probationary service flows exceeding the maximum number of probationary service flows.

14. A system for admission control to manage network resources, the system comprising:
means for receiving a request for activation of a service flow;
means for identifying a service flow type associated with the service flow;
means for determining an assigned priority associated with the service flow based on the service flow type;
means for automatically adding a probationary service flow at a first priority to a network to deliver traffic across the network for an application session, wherein the first priority is a probationary priority that is lower than the assigned priority associated with the service flow, and wherein the service flow is given a probationary priority for a temporary duration of time, the temporary duration of time comprising a duration of time from the activation of the service flow until a determination is made that the network is stable;
means for determining whether the network is stable as a result of the addition of the probationary service flow; and
means for assigning a second priority to the added probationary service flow when the network is stable, wherein the second priority is the assigned priority associated with the service flow.

* * * * *